United States Patent
Nguyen et al.

(10) Patent No.: US 9,994,307 B2
(45) Date of Patent: Jun. 12, 2018

(54) VERTICAL TAKE-OFF-AND-LANDING UNMANNED AERIAL VEHICLE SYSTEM CAPABLE OF LANDING ON UNEVEN OR SLOPED TERRAIN

(71) Applicant: The United States of America as represented by the Secretary of the Navy, Washington, DC (US)

(72) Inventors: Hoa G. Nguyen, San Diego, CA (US); Aaron B. Burmeister, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/081,163

(22) Filed: Mar. 25, 2016

(65) Prior Publication Data
US 2017/0274988 A1     Sep. 28, 2017

(51) Int. Cl.
*B64C 25/28* (2006.01)
*B64C 25/32* (2006.01)
*B64C 25/52* (2006.01)
*B64C 29/00* (2006.01)
*B64C 39/02* (2006.01)
*B64C 25/00* (2006.01)

(52) U.S. Cl.
CPC .............. *B64C 25/28* (2013.01); *B64C 25/32* (2013.01); *B64C 25/52* (2013.01); *B64C 29/00* (2013.01); *B64C 39/024* (2013.01); *B64C 2025/008* (2013.01); *B64C 2201/088* (2013.01); *B64C 2201/141* (2013.01); *B64C 2201/18* (2013.01)

(58) Field of Classification Search
CPC ......... B64C 25/28; B64C 25/52; B64C 25/32; B64C 29/00; B64C 39/024; B64C 2201/088; B64C 2201/18; B64C 2201/141; B64C 2025/008
See application file for complete search history.

(56) References Cited

U.S. PATENT DOCUMENTS

| | | | | |
|---|---|---|---|---|
| 2,927,747 | A * | 3/1960 | Bennie | B64C 25/52 244/17.17 |
| 5,521,827 | A * | 5/1996 | Lindberg | G01M 1/125 177/141 |
| 7,871,044 | B2 * | 1/2011 | Hursig | B64C 27/20 244/183 |
| 7,890,249 | B2 * | 2/2011 | Davis | G01M 1/125 701/124 |
| 2012/0298796 | A1 * | 11/2012 | Carreker | B64G 1/22 244/100 R |

(Continued)

*Primary Examiner* — Michael J Zanelli
(74) *Attorney, Agent, or Firm* — SPAWAR Systems Center Pacific; Kyle Eppele; Susanna Torke

(57) ABSTRACT

A system for landing, comprising a vertical-take-off-and-landing (VTOL) unmanned air vehicle (UAV) having landing gear, wherein the landing gear is telescopic and comprises a sensor, and wherein the landing gear is compressed upon landing on a surface, and the compression causes a signal to be sent to a system that computes the slope of the ground surface using the length of the compressed landing gear and the attitude of the UAV. If the center of gravity falls within the support area, the legs are locked and the UAV power is turned off. If the center of gravity falls outside the support area, the UAV is forced to take off and find a safer landing spot.

19 Claims, 4 Drawing Sheets

(56) References Cited

U.S. PATENT DOCUMENTS

2014/0249702 A1\* 9/2014 Pflug .................... B64C 25/001
   701/16
2016/0272308 A1\* 9/2016 Gentry ................... B64C 25/10

\* cited by examiner

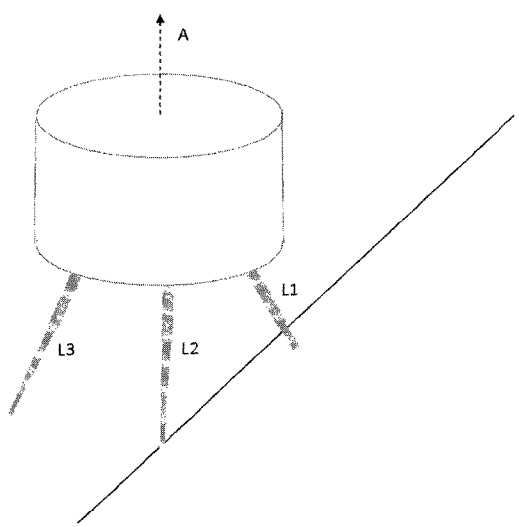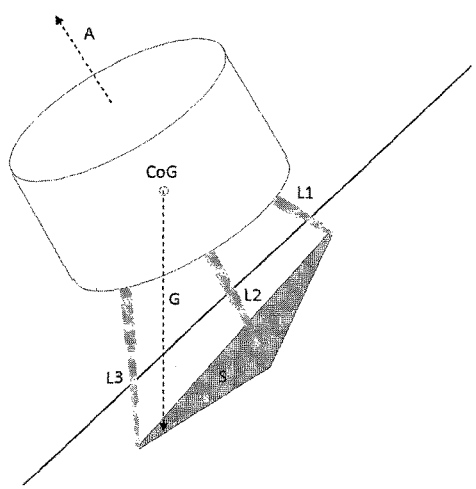
Fig. 1a
Fig. 1b

VERTICAL TAKE-OFF-AND-LANDING UNMANNED AERIAL VEHICLE SYSTEM CAPABLE OF LANDING ON UNEVEN OR SLOPED TERRAIN

FEDERALLY-SPONSORED RESEARCH AND DEVELOPMENT

The VTOL UAV System Capable of Landing on Uneven or Sloped Terrain is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 102573.

BACKGROUND

The ability of a Vertical Take-Off-and-Landing (VTOL) Unmanned Aerial Vehicle (UAV) to land on uneven or sloped terrain is an unsolved challenge. In the mid-1990s, an Air-Mobile Ground Security and Surveillance System (AMGSSS), a multi-modal sensor package carried by the Sikorsky Cypher, a toroid-shaped UAV with counter-rotating rotors in the middle, was developed. The system was designed to fly and park on hilltops and rooftops, providing multi-day security sensing with video, infrared sensors, and motion detection capabilities. However, AMGSSS was only able to land on flat rooftops, severely limiting where it can perform its mission.

One idea presented here is to use onboard sensors to determine if the terrain below is flat and level enough for the UAV to land. The UAV can work by itself or in conjunction with a sensor-based terrain selection method, and can enhance the effectiveness of the terrain selection, allow operation on more rugged terrain, and allow greater margins of error.

BRIEF DESCRIPTION OF THE DRAWINGS

FIG. 1A shows a 3D view of a VTOL UAV having three legs, attempting to land on a sloped surface.

FIG. 1B shows a 3D view of a VTOL UAV having three legs, attempting to land on a sloped surface, showing the center of gravity of the VTOL UAV inside a shaded area of support.

DETAILED DESCRIPTION OF SOME EMBODIMENTS

Figure 2:
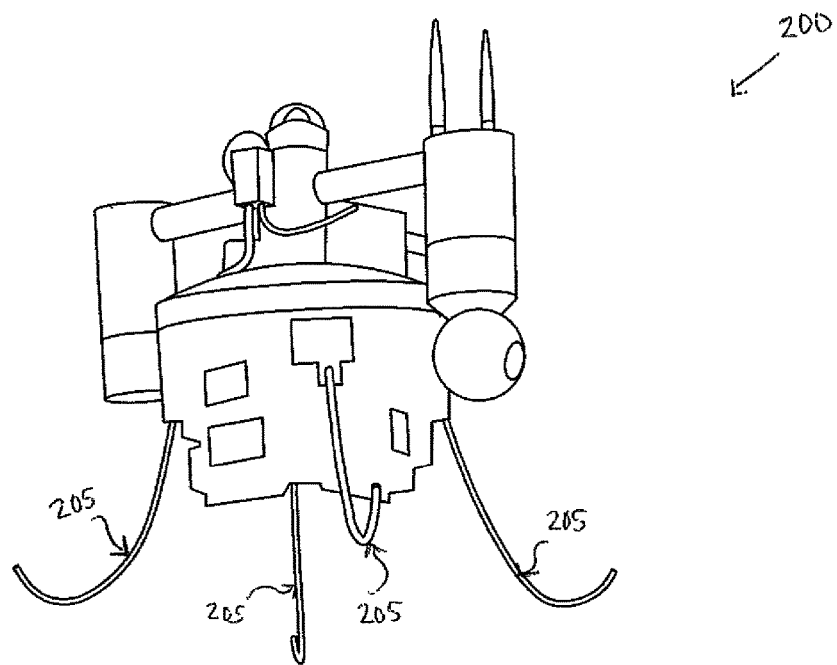
FIG. 2 shows a 3D view of one embodiment of a VTOL UAV having four legs.

Reference in the specification to "one embodiment" or to "an embodiment" means that a particular element, feature, structure, or characteristic described in connection with the embodiments is included in at least one embodiment. The appearances of the phrases "in one embodiment," "in some embodiments," and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Described herein is an intelligent and flexible landing system. The legs of the vertical-take-off-and-landing (VTOL) unmanned aerial vehicle (UAV), or the rods connecting the landing ring or skids to the UAV body, will be telescopic rods having sensors that detect pressure or touch, optical, linear, or compression sensors, or a similar sensor that one having ordinary skill in the art would use. As the UAV lands, the legs will be compressed by the ground, perhaps one at a time depending on the slope on which it is landing. Touch sensors will be placed on the bottom of the legs or landing gear to sense when the VTOL UAV has reached a surface. When all the legs (or complete landing gear) have touched the surface (detected when the last leg or landing gear is compressed), the touch sensors and compression sensors will send that information to a computer system inside the UAV that can then compute the slope of the of the ground surface and the attitude of the UAV. The computer system then projects the UAV's center of gravity (CoG) vertically onto an area of support (a triangle for three legs, an ellipse for a landing ring, and a quadrilateral for two skids) and determines if the UAV's center of gravity falls inside this area. The area of support, or support area, is the area in which the CoG of the UAV is low enough to prevent the UAV from tipping over upon landing. The size and location of the area of support depends on the slope of the surface on which the UAV is attempting to land. If the CoG falls within the area of support, this indicates that the UAV will not tip over, and the system will lock the legs and allow the UAV's power to be shut off. Otherwise, the system will force the UAV to lift off again and try a different landing site.

FIG. 1*a*-1*b* show an example of a UAV having three telescopic legs. A UAV will typically start the landing vertically (vector A is vertical as in FIG. 1*a*) as much as allowed by crosswind. If the surface is sloped or uneven, one leg (L1) would touch the surface first. Since all legs are telescopic, leg L1 would start being compressed by the surface contact, while other legs (L2 and L3) are still fully extended. Once L1 is fully compressed and the UAV continues to descend, it will start tilting as in FIG. 1*b*, and L2 and L3 will in turn touch the ground and start compressing.

When the system senses that the last leg has touched the surface, the system computes the slope of the of the ground surface and the attitude of the UAV, and then uses that information to compute the support area (S). (A safety factor can be incorporated by adding an offset on the perimeter of the support area to slightly enlarge it.) It then projects the CoG vertically along the gravity vector (G) onto S. If the projected CoG falls within the support area S, the UAV will not tip over. The system will lock the legs and allow the UAV power to be turned off. If the projected CoG is outside the support area S, the system will inform the UAV control program of the unsafe landing condition to force the UAV to take off and find a better landing spot.

The support area S will be a triangle for a 3-legged UAV, an ellipse for a UAV with a circular landing ring, and a quadrilateral for a helicopter-like UAV with skids.

FIG. 2 shows one embodiment of a VTOL UAV 200 having four legs 205 for landing gear. In this embodiment, each one of four legs 205 would have a touch sensor on the bottom of each leg 205 to detect when the leg touches a surface, and another sensor on the side of the leg to detect the amount of compression once leg 205 touches the surface. The sensors are not visible in this figure.

Figure 3:
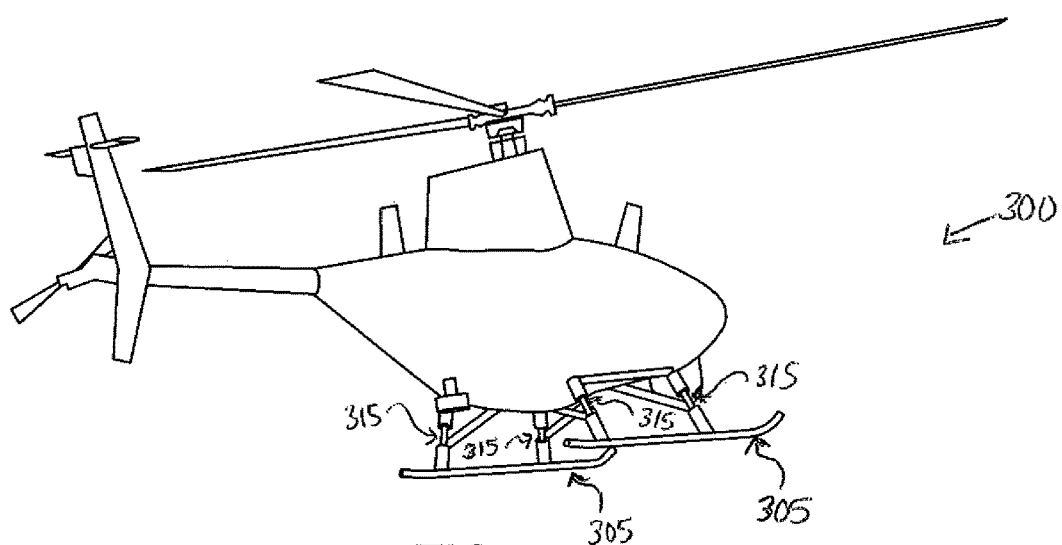
FIG. 3 shows a 3D view of one embodiment of a VTOL UAV having two skids.

FIG. 3 shows one embodiment of a VTOL UAV 300 having two skids 305 for landing gear. Each skid 305 is attached to a rod 315. Skids 305 and rods 310 would have one or two sensors on the bottom to detect when the skids touch a surface. Each rod would also have a compression sensor to detect the level of compression upon landing. The sensors are not visible in this figure.

Figure 4:
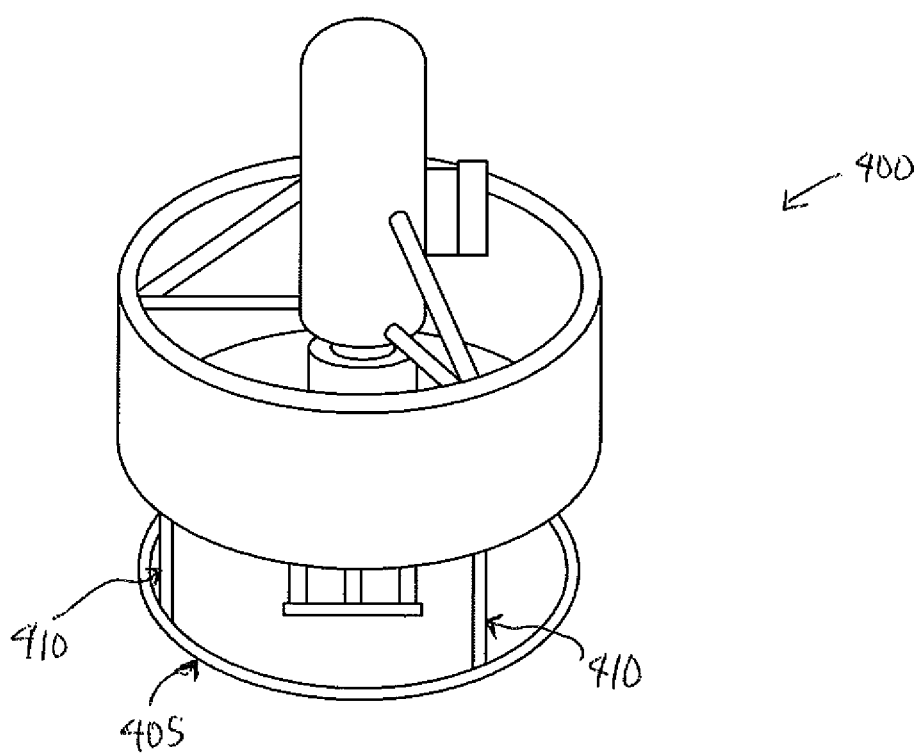
FIG. 4 shows a 3D view of one embodiment of a VTOL UAV having a circular landing gear.

FIG. 4 shows one embodiment of a VTOL UAV 400 having circular landing ring 405 connected to rods 310. In this embodiment, landing ring 405 would have at least one touch sensor on the bottom to detect when the landing ring touches a surface, and rods 410 would have another sensor to detect the amount of compression once landing ring 405 touches the surface. The sensors are not visible in this figure.

Figure 5:
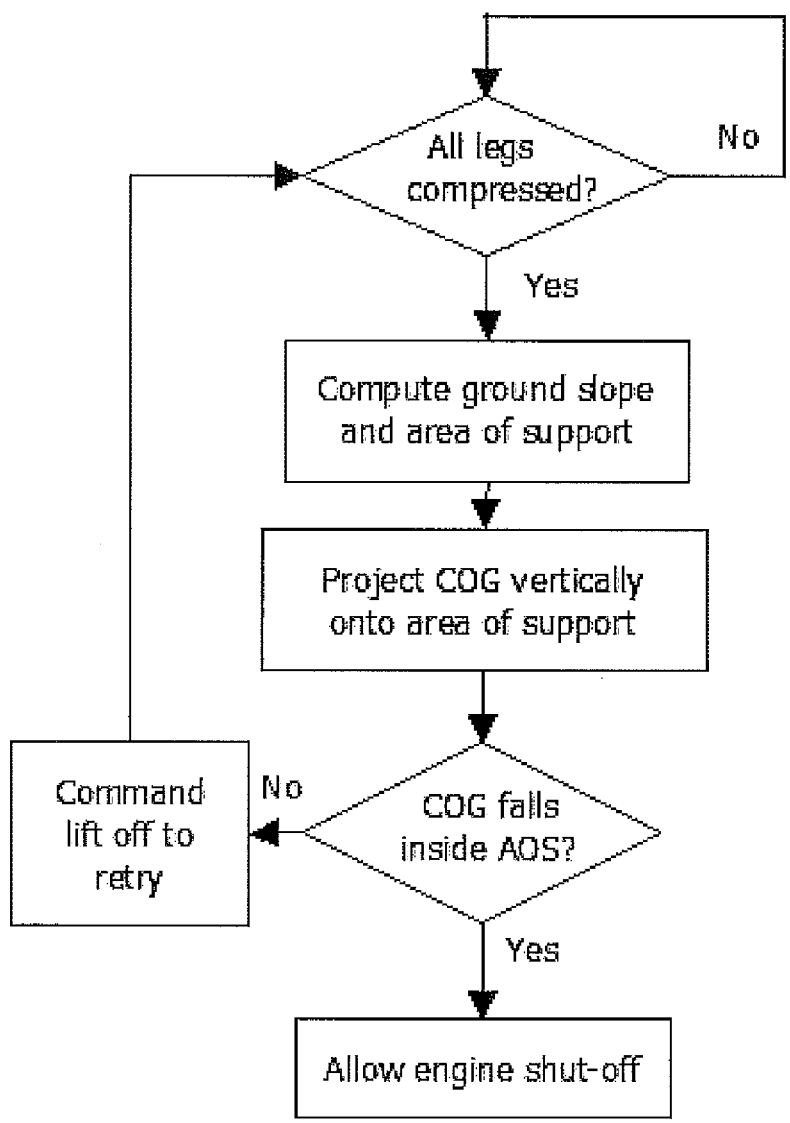
FIG. 5 shows a flow chart depicting a method for landing a VTOL UAV on a sloped surface.

FIG. 5 shows a flow chart of events in determining whether a VTOL UAV is safe to land based on the slope of the landing surface. First, each VTOL UAV will sense if the legs area all compressed. If so, sensors send compression information to a computer inside the UAV that will then compute the ground slope and area of support. The computer will project the center of gravity vertically onto the area of support. If the center of gravity falls inside the area of support, this means the VTOL UAV is safe to land, and the engine will be allowed to be shut off. If the center of gravity falls outside the area of support, the VTOL UAV is not safe to land, and thus the computer will command lift off to retry landing in another location.

Alternative embodiments include an unmanned vehicle where, instead of a uniformly sloped terrain as in FIGS. 1a-1b, leg L1 could be stopped by a rock, for example, on otherwise level terrain. The same concept still applies. That is, the support area S does not have to be on the ground surface, it is rather just a geographical concept that could be floating in the air.

Additionally, another embodiment could use manned air vehicles rather than unmanned air vehicles. It would assist the pilot in making safe landing decisions. Instead of signaling the UAV control electronics, it could signal the pilot (for example, via a red light and alarms) of unsafe landing conditions.

This invention can work by itself or in conjunction with a sensor-based terrain selection method, in which case it will enhance the effectiveness of the terrain selection, allow operation on more rugged terrain, and allow greater margins of error.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for landing, comprising:
   a vertical-take-off-and-landing (VTOL) unmanned air vehicle (UAV) having a known center of gravity (CoG), wherein the UAV further comprises telescopic landing gear that is compressed upon landing on a surface, and an internal computer system configured to sense when the landing gear is compressed and the level of compression.

2. The system of claim 1 wherein the landing gear further comprises a plurality of sensors to detect when the landing gear touches the surface and the level of compression of the landing gear.

3. The system of claim 2 wherein the plurality of sensors are configured to send a signal to the internal computer system, and wherein the internal computer system is configured to use the level of compression of the landing gear to compute the slope of the surface and the attitude of the UAV.

4. The system of claim 3 wherein the computed slope projects the UAV's CoG vertically onto an area of support, and wherein the internal computer system determines whether the UAV's CoG falls inside the area of support.

5. The system of claim 4 wherein the CoG falls inside the area of support, and wherein the internal computer system is configured to lock the landing gear and shut the UAV's power off.

6. The system of claim 5, wherein the CoG falls outside the area of support, and wherein the internal computer system is configured to direct the UAV to lift off and find a different landing site.

7. The system of claim 6, wherein the landing gear comprises three legs, and wherein each leg comprises a touch sensor and a compression sensor.

8. The system of claim 6 wherein the landing gear comprises two skids, and wherein each skid comprises at least one touch sensor and at least one compression sensor.

9. A system for landing comprising a UAV having landing gear, wherein the landing gear further comprises a plurality of sensors, and wherein the landing gear is compressed upon reaching a surface, and wherein the plurality of sensors sends a signal to a computer that computes the length of the compressed landing gear, then uses the length of the compressed landing gear to compute the slope of the surface.

10. The system of claim 9 wherein the UAV has a known Center of Gravity (CoG), and wherein the CoG falls within support area (S), and wherein the computer is configured to direct the landing gear to lock and the UAV's power to be turned off.

11. The system of claim 10 wherein the CoG falls outside the support area (S), and wherein the computer is configured to direct the UAV to take off and find an alternate landing spot.

12. The system of claim 11 wherein the landing gear further comprises three legs.

13. The system of claim 12 wherein the support area (S) is a triangle.

14. The system of claim 11 wherein the landing gear comprises a circular landing ring.

15. The system of claim 14 wherein the support area (S) is an ellipse.

16. The system of claim 11 wherein the landing gear comprises two skids.

17. The system of claim 16 wherein the support area (S) is a quadrilateral.

18. A method of landing on a sloped surface comprising the steps of:

having a vertical-take-off-and-landing (VTOL) unmanned air vehicle (UAV) with a known center of gravity, wherein the VTOL UAV further comprises telescopic landing gear comprising touch and compression sensors, wherein the landing gear is compressed upon touching a surface;

sending touch and compression information via the sensors to a computer inside the VTOL UAV allowing for calculation of slope and area of support;

using the computer to determine whether the center of gravity falls inside the area of support;

using the computer to direct the VTOL UAV to land and fully power off if the center of gravity falls inside the area of support.

19. The method of claim 18 wherein if the center of gravity falls outside the area of support, the computer directs the VTOL UAV to take off and find an alternate landing site.

* * * * *